Sept. 18, 1962   A. V. ALEXEFF ETAL   3,054,547
TENSION-RESPONSIVE WRAP-ADJUSTING WEB GUIDING APPARATUS
Filed Jan. 17, 1961   5 Sheets-Sheet 1

INVENTORS
ALEXANDER V. ALEXEFF
HOWARD R. RICHARDS
BY
ATTORNEYS

INVENTORS
ALEXANDER V. ALEXEFF
HOWARD R. RICHARDS

ATTORNEYS

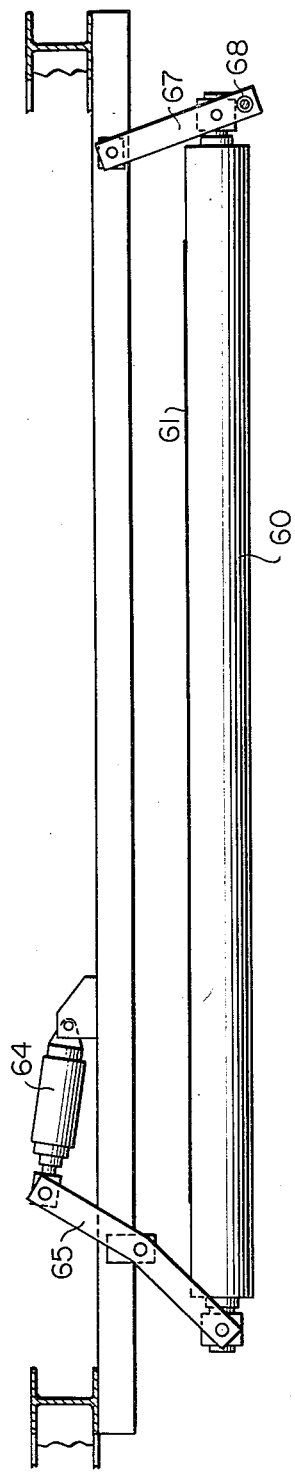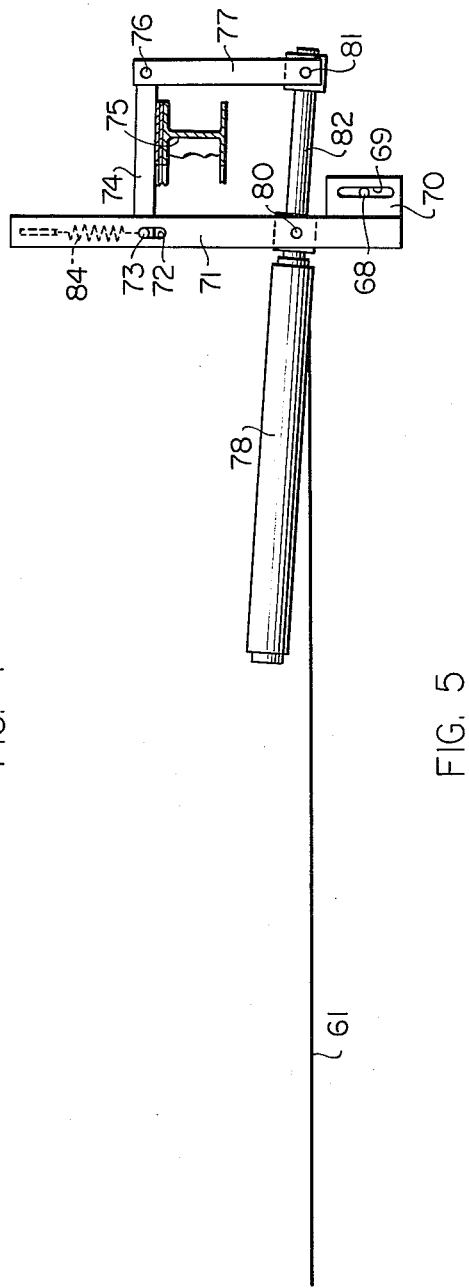
FIG. 4
FIG. 5
INVENTORS
ALEXANDER V. ALEXEFF
HOWARD R. RICHARDS
BY
ATTORNEYS Sept. 18, 1962   A. V. ALEXEFF ETAL   3,054,547
TENSION-RESPONSIVE WRAP-ADJUSTING WEB GUIDING APPARATUS
Filed Jan. 17, 1961   5 Sheets-Sheet 4

INVENTORS
ALEXANDER V. ALEXEFF
HOWARD R. RICHARDS
BY
ATTORNEYS

United States Patent Office 3,054,547
Patented Sept. 18, 1962

3,054,547
TENSION-RESPONSIVE WRAP-ADJUSTING WEB
GUIDING APPARATUS
Alexander V. Alexeff, Cleveland, and Howard R. Richards, Lakewood, Ohio, assignors to Industrial Ovens, Incorporated, Cleveland, Ohio, a corporation of Ohio
Filed Jan. 17, 1961, Ser. No. 83,201
2 Claims. (Cl. 226—198)

This invention relates to apparatus for guiding and centering traveling webs of paper, fabric, film, metal and the like where means is provided according to previously developed concepts for progressively moving and guiding a roll or rolls back and forth through a progression of positions with each position in the progression corresponding to a particular degree of establishment of a web guiding attitude.

The invention is further applicable to web guiding apparatus of the above general type which also provides for a bodily shifting of the guide roll means to accomplish a quick-correct action as previously taught, for example, in U.S. Patents 2,797,091 and 2,722,415 and also in our copending application Serial No. 23,878, filed April 13, 1960.

Variation of the web guiding attitude in web guiding apparatus of the above general type accomplishes the guidance of the web. In general, the correcting action obtained by variations of the web guiding attitude may be amplified by increasing the wrap of the web on the guiding rolls. In general, the greater the amount of wrap, the more exaggerated the correcting action.

It is furthermore characteristic of web guiding apparatus of the above general type that high web tensions cause an amplification of the correcting action and low web tensions result in a diminished correcting action. In fact, the web guiding apparatus becomes inoperative at relatively low tensions unless a considerable degree of wrap obtains because the roll wholly fails to interact with the web in guiding relationship therewith. Conversely, the apparatus becomes inoperative at high tensions with too high a degree of wrap because the corresponding action is too severe resulting in an instable condition which may double or destroy the web.

The present invention involves the concept of varying the wrap on a web guiding roll or rolls in a manner that is advantageously responsive to web tension, the relationship of the parts being maintained so that the guiding attitude may be varied to accomplish guiding of the web at any one of an infinite number of degrees of wrap.

The advantages will become more fully apparent from the following description.

In the drawings:

FIGURES 3–6 show apparatus generally similar to that of FIGURES 1–3 of our aforesaid copending application Serial No. 23,878 but embodying the concepts of the present invention.

Figure 1:
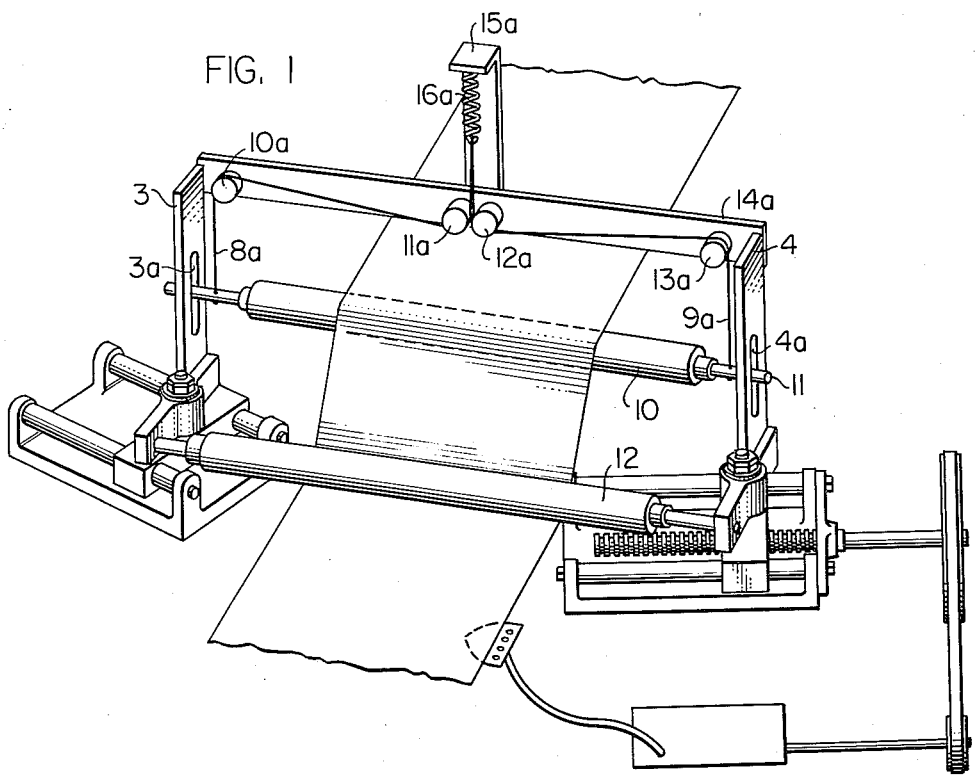
FIGURE 1 illustrates apparatus generally similar to that shown in U.S. Patent 2,797,091 but embodying the concepts of the present invention.

Shown in FIGURE 1 is a web shifting apparatus similar to that shown in U.S. Patent 2,797,091 to Fife and including the rolls 10 and 12 which correspond to those shown in such patent. The apparatus shown in FIGURE 1 may be identical to that shown in the patent with the exception that Fife's vertical post portions 3 and 4 are extended upwardly and provided with slots 3a and 4a. Fife's roller shaft 11 is guided in the slots 3a and 4a and is supported by the cables 8a and 9a. The cables are guided on sheaves 10a, 11a, 12a, 13a which are in turn supported on a cross member 14a extending between the posts 3 and 4. A central post 15a extending upwardly from the cross member 14a supports the upper end of a tensioned spring 16a which is affixed to the upper ends of the cables 8a and 9a. The higher the tension on the web being guided, the further the spring 16a will be extended and the lower the roll 10 will be forced by the web thereby decreasing the amount of wrap on the rolls 10 and 12 and compensating in this manner for the tendency of the increase of web tension to exaggerate the correcting action of the rolls.

Figure 2:
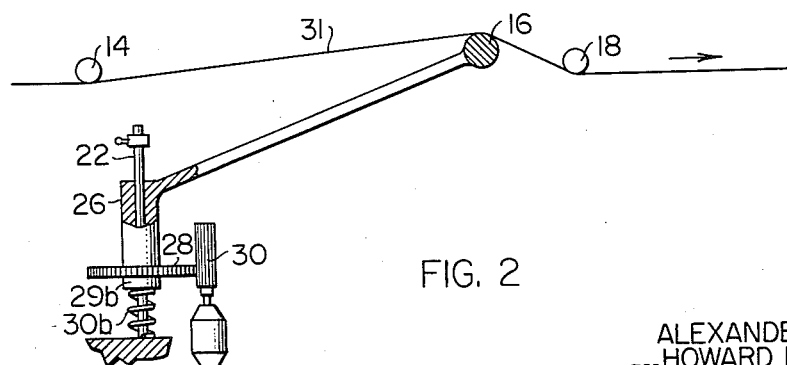
FIGURE 2 shows apparatus generally similar to that shown in U.S. Patent 2,722,415 but embodying the concepts of the present invention.

Shown in FIGURE 2 is a web shifting apparatus similar to that shown in U.S. Patent 2,722,415 to Wood and including the rolls 14, 16 and 18 which correspond to the rolls of identical reference numerals shown in such patent. The apparatus shown in FIGURE 2 may be identical to that shown in such patent with the exception that Wood's pivot member 22 may extend downwardly to be fixed to a base as shown in applicants' FIGURE 2 and Wood's "fixed bearing support" may be replaced by the sleeve 26 shown in applicants' FIGURE 2, the sleeve 26 being rotatable on the shaft 22 and slidable upwardly and downwardly thereon. Wood's spur gear is elongated as shown in applicants' FIGURE 2 so tha the gears 28 and 30 will remain engaged as the sleeve 26 slides up and down on the shaft 22. The assemblies of the sleeve 26 and gear 28 are provided at the bottom sides with a suitable bearing member 29b against which presses a spring 30b causing the roll 16 to tend to be pushed upwardly into deeper penetration with respect to the passing web 31 to thereby increase the wrap of the web around the roll 16. The higher the tension on the web 31, the further down the roll 16 and the sleeve 26 will be forced against the bias of the spring 30b thereby automatically decreasing the intensity of the correcting action of the apparatus. This correcting action results from changing the position of the roll 16 by rotation of the sleeve 26 around the shaft 22.

Figure 3:
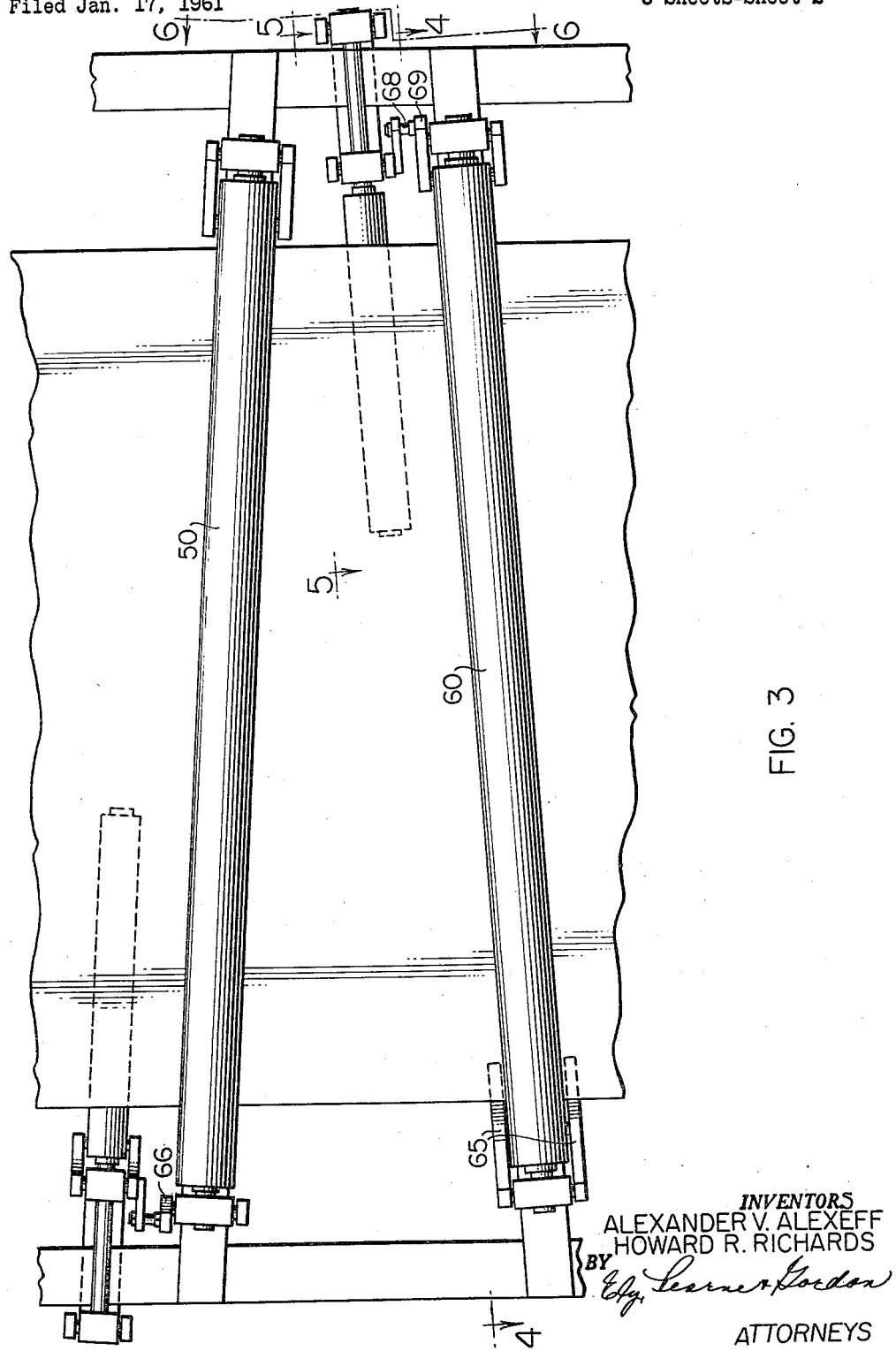

In FIGURES 3–6 is shown apparatus wherein the guide roll means 50 and 60 are skewed with respect to the direction of web travel and are mounted to move inwardly and outwardly into deeper and less deep engagement with the web to effect a guiding action thereon as in the apparatus shown in FIGURES 1–3 of our aforesaid copending application Serial No. 23,878. As will be clear from the description of our said application, the roll 60 is associated with the right side of the web 61 as viewed in FIGURE 4 and is adapted to move from the parallel-to-web position shown in FIGURE 4 of the present application to a position where the roll relatively deeply engages the right side of the web 61 and progressively relatively less deeply engages portions of the web 61 inboard of such right side. In the particular apparatus shown in FIGURES 3–6, the pivoting movement is accomplished by a double acting pneumatic cylinder 64 acting through a link 65. The upper roll 50 is similarly actuated by a pneumatic cylinder (not seen) acting through the link 66 (FIGURE 3).

It will be understood that the mechanism described below associated with the roll 60 is substantially identical with symmetrically arranged duplicate apparatus associated with the roll 50 but located at the opposite side of the web 61.

The link or lever 67 which carries the right end of the roll 60, as viewed in FIGURE 3, carries at its outer end a drive pin 68 which is received within a slot 69 of a plate 70 fixed to a lever 71. The lever 71 is provided with another slot 72 which is slidingly received on a pin 73 which projects from a stationary bar 74 fixed to a frame member 75. Pivoted to the bar 74 at the pivot point 76 is a link 77.

A roll 78 is provided, the shaft of which is journaled in journaling means pivoted to the lever 71 at the pivot point 80 and to the link 77 at the pivot point 81. The portion of the shaft of the roll 78 which extends between the pivot points 80 and 81 comprises a link 82 which, together with the elements 71 and 77, form a pantograph linkage.

The link or lever 71 is joined by tension springs 84 (FIGURES 5 and 6) to a fixed plate 85 attached to the frame member 75 or to the fixed bar 74. The slots 69 and 72 guide the member 71 for a limited reciprocating movement on the pins 68 and 73 against the bias of the springs 84 which tend to force the lever 71 to one end position corresponding to the position A or B (as designated in FIGURE 7) or some intermediate position therebetween. Which such end position or intermediate position applies at any given movement depends on the position of the pin 68 and consequently on the position of the roll 60 at that moment.

The position of the roll 60 is governed by edge sensing apparatus which controls the double-acting pneumatic cylinder 64 to vary the position of the roll 60 in accordance with the sensed position of the right hand edge of the web 61. The position of the roll 60 varies from the position shown in FIGURE 4 to an extreme position rightwardly thereof and during this movement the pin 68 moves in an arcuate path while also maintaining a driving engagement with the slot 69, carrying the roll 78 between position A as indicated in FIGURE 7 and position B as indicated in FIGURE 7.

Figure 7:
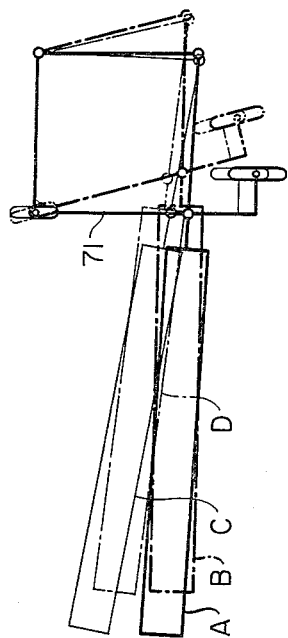
FIGURE 7 is a schematic view corresponding to FIGURE 5 and showing various positions of part of the apparatus.
Figure 6:
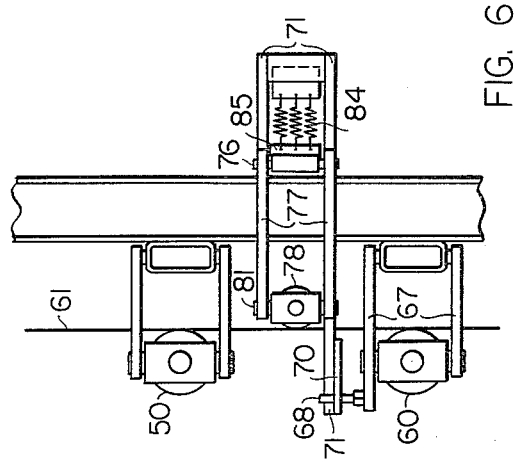

When the roll 78 is in position A or B shown in FIGURE 7 and web tension is increased, the bias of the springs 84 is overcome to a degree dependent upon web tension to thereby shift the roll 78 from position A toward position C, or from position B toward position D, reference being had to the positions indicated in FIGURE 7. Of course it will be understood that unbiased positions intermediate the unbiased positions A and B will obtain when the roll 60 is in positions intermediate that shown in FIGURE 4 and the other extreme position of the roll 60, and that at such intermediate positions the roll 78 will remain capable of being forced by increased web tension into a relationship of less wrap with respect to the web 61.

A load imposed on roll 78 by the tension of the passing web is in turn imposed in compression on the member 71 according to the sine function of the included angle between the member 71 and the fixed bar 74. Since this included angle does not vary extensively from 90 degrees, the web tension necessary to overcome the springs 84 varies insignificantly as the apparatus is moved between positions A to B as these positions are indicated in FIGURE 7.

Figure 8:
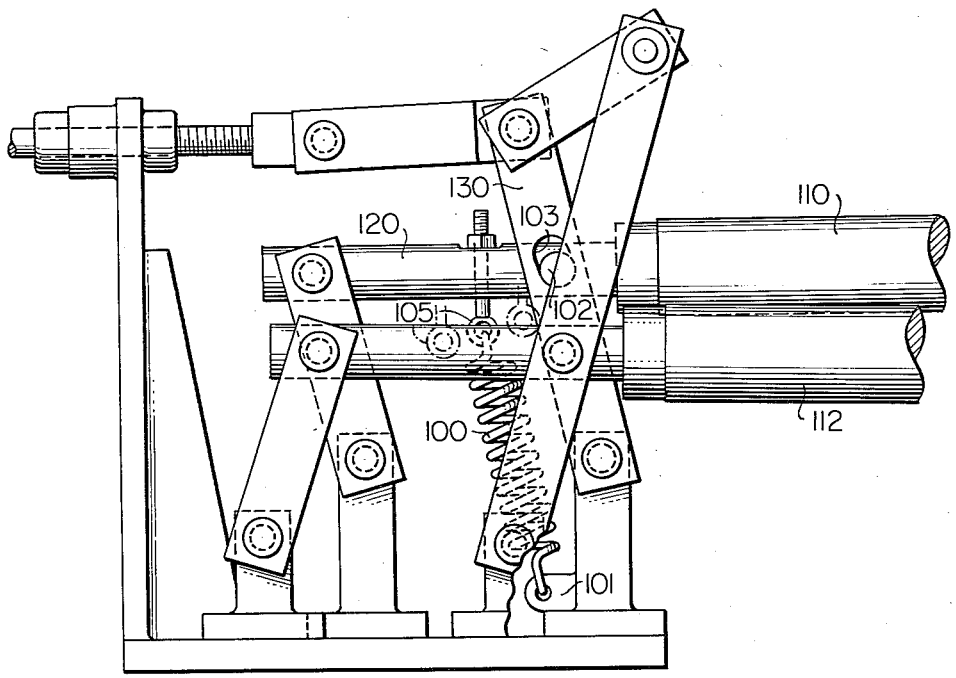
FIGURE 8 is a view of the apparatus similar to that disclosed in our copending application Serial No. 77,041, filed December 20, 1960, and particularly the showing of FIGURE 1 thereof but embodying the concepts of the present invention.

Shown in FIGURE 8 is an apparatus which is identical (with below noted exceptions) with the apparatus of FIGURE 1 described in our aforesaid copending application Serial No. 77,041 and the description of which is hereby adopted as if fully repeated herein.

The exceptions to the identity of the apparatus of FIGURE 8 to our previously disclosed apparatus relates to the provision of a spring 100 which at one end is attached to a fixed member 101 and which at the other end is fixed to an eyebolt 105 which in turn is anchored to the shaft 120 which corresponds to the shaft 20 in our previous disclosure. Another exception is that the connection between the lever 130 and the shaft 120 (the lever 130 corresponding to the lever 30 in our previous disclosure) is accomplished in the present apparatus by the provision of a pin 102 which is received within a slot 103 formed on the two sides of the lever member 130 so that the pin 102 is capable of vertical or substantially vertical movement within the slot 103.

The result is that the degree of wrap of a passing web around the rolls 110 and 112 (corresponding to the rolls 10 and 12 of our previous disclosure) is reduced at high web tensions by the upward movement of the pivot point 102 within slot 103 against the bias of the spring 100. The apparatus in FIGURE 8 is at an intermediate location with respect to the various guiding attitudes it may assume. At the extreme guiding attitudes of the apparatus, the locations of the eyebolt 105 will be somewhat displaced as illustrated by the two dotted line showings thereof in FIGURE 8. However it will be clear from FIGURE 8 that the change in guiding attitude from one extreme to the other involves little or no variation in the tension of the spring 100. Furthermore the longitudinal axis of the spring 100 remains at all times angularly displaced by only a small angle from a condition of parallelism to a transverse plane passing through the roll 110. Accordingly, variation in locations of the eyebolts 105 will affect web tension only according to a sine function of an angle which is close to 90 degrees so that the web tensions necessary to displace the roll 110 upwardly through corresponding displacement increments remain substantially constant at all guiding attitudes of the apparatus.

The above description of the invention should make it apparent that many details of the apparatus embodying the invention may be varied without departing from the teaching of the invention. Accordingly, the scope of the invention is not to be limited to precise details of the specifically described embodiments but is to be defined by the following claims.

What is claimed is:

1. Web guiding apparatus comprising roll means guidingly engaging a web which is wrapped about a portion of the periphery of the roll means, means for progressively moving the roll means back and forth through a progression of attitudes with respect to said web with each attitude in said progression corresponding to a particular degree of establishment of a corrective web guiding action and with said each attitude being distinguishable from the other attitudes by other than its associated amount of wrap of said web on said roll means, and web tension responsive means for varying the amount of the wrap of said web on said roll means through a progression of values as an inverse function of web tension through a progression of values.

2. Web guiding apparatus comprising roll means guidingly engaging a web which is wrapped about a portion of the periphery of the roll means, means for progressively moving the roll means back and forth through a progression of attitudes with respect to said web with each attitude in said progression corresponding to a particular degree of establishment of a corrective web guiding action and with said each attitude being distinguishable from the other attitudes by other than its associated amount of wrap of said web on said roll means, said back and forth movement through said progression of attitudes including bodily longitudinal shifting of said roll means back and forth along direction transverse to said web, and web tension responsive means for varying the amount of the wrap of said web on said roll means through a progression of values as an inverse function of web tension through a progression of values.

References Cited in the file of this patent

UNITED STATES PATENTS

| | | |
|---|---|---|
| 2,182,928 | Mehaffey | Dec. 12, 1939 |
| 2,228,519 | Hetherington | Jan. 14, 1941 |
| 2,476,070 | Solliday | July 12, 1949 |
| 2,807,465 | Newell | Sept. 24, 1957 |

FOREIGN PATENTS

| | | |
|---|---|---|
| 1,196,563 | France | May 25, 1959 |